(12) United States Patent
Beech

(10) Patent No.: US 12,485,713 B2
(45) Date of Patent: Dec. 2, 2025

(54) CONNECTOR APPARATUS TO CONNECT A TOW VEHICLE WITH A WAGON

(71) Applicant: Geoffrey Beech, Madison, AL (US)

(72) Inventor: Geoffrey Beech, Madison, AL (US)

( * ) Notice: Subject to any disclaimer, the term of this patent is extended or adjusted under 35 U.S.C. 154(b) by 205 days.

(21) Appl. No.: 18/411,825

(22) Filed: Jan. 12, 2024

(65) Prior Publication Data
US 2024/0326528 A1 Oct. 3, 2024

Related U.S. Application Data

(60) Provisional application No. 63/577,062, filed on Mar. 27, 2023.

(51) Int. Cl.
*B60D 1/24* (2006.01)
*B60D 1/62* (2006.01)
*B60L 15/20* (2006.01)

(52) U.S. Cl.
CPC ............ *B60D 1/242* (2013.01); *B60D 1/249* (2013.01); *B60D 1/62* (2013.01); *B60L 15/2009* (2013.01)

(58) Field of Classification Search
CPC .......... B60D 1/242; B60D 1/249; B60D 1/62; B60D 1/06; B60D 1/248; B60D 1/30; B60L 15/2009
See application file for complete search history.

(56) References Cited

U.S. PATENT DOCUMENTS

| | | | | |
|---|---|---|---|---|
| 2,959,427 | A * | 11/1960 | Keese | B60D 1/50 280/495 |
| 6,796,572 | B1 * | 9/2004 | McGhie | B62D 13/00 280/426 |
| 7,137,643 | B1 * | 11/2006 | Hsueh | B60D 1/32 280/455.1 |
| 8,365,849 | B2 | 2/2013 | Bartel | |
| 10,077,980 | B2 * | 9/2018 | Banerjee | G01B 21/24 |
| 11,136,031 | B2 | 10/2021 | Rabbiosi et al. | |
| 2001/0054524 | A1 * | 12/2001 | Masters | B62D 13/025 280/426 |
| 2007/0194557 | A1 * | 8/2007 | Caporali | B62D 12/02 280/493 |

(Continued)

FOREIGN PATENT DOCUMENTS

DE 2460451 A1 6/1976
GB 2466086 A 6/2010

*Primary Examiner* — Sze-Hon Kong
(74) *Attorney, Agent, or Firm* — Briggs Intellectual Property Law; Jeremy A. Briggs

(57) ABSTRACT

A connector apparatus configured to connect a first vehicle with a second vehicle is disclosed. The apparatus may include a first portion connected to the first vehicle and a second portion connected to the second vehicle. The second portion may be engaged with the first portion and configured to move horizontally relative to a first portion longitudinal axis when the second vehicle accelerates or decelerates. The apparatus may further include a sensor unit connected with the first portion and the second portion. The sensor unit may be configured to determine a distance and a direction of a second portion horizontal movement when the second portion moves relative to the first portion longitudinal axis, and generate a signal based on the distance and the direction. The sensor unit may further transmit the signal to a first vehicle microprocessor that may control a first vehicle operation based on the signal.

20 Claims, 10 Drawing Sheets

(56) References Cited

U.S. PATENT DOCUMENTS

| | | | |
|---|---|---|---|
| 2008/0012695 A1* | 1/2008 | Herschell | B60T 7/18 |
| | | | 340/431 |
| 2012/0080866 A1* | 4/2012 | West | B60D 1/015 |
| | | | 280/476.1 |
| 2013/0079980 A1 | 3/2013 | Vuk et al. | |
| 2015/0137482 A1 | 5/2015 | Woolf et al. | |
| 2016/0243908 A1* | 8/2016 | Lannen | B60D 1/62 |
| 2018/0370306 A1* | 12/2018 | Algüera | B60D 1/025 |
| 2023/0097576 A1* | 3/2023 | Laine | B60D 1/015 |
| | | | 280/412 |
| 2023/0339455 A1* | 10/2023 | Weston | B60W 40/114 |
| 2023/0382171 A1* | 11/2023 | Kortesalmi | B62D 53/062 |
| 2024/0010035 A1* | 1/2024 | Jelinek | B60D 1/46 |
| 2024/0017623 A1* | 1/2024 | Stenbratt | B60T 8/172 |
| 2024/0336096 A1* | 10/2024 | Van De Loo | B60D 1/06 |

* cited by examiner

CONNECTOR APPARATUS TO CONNECT A TOW VEHICLE WITH A WAGON

CROSS-REFERENCE TO RELATED APPLICATION

This application claims priority to and the benefit of U.S. provisional application No. 63/577,062, filed Mar. 27, 2023, which is hereby incorporated by reference herein in its entirety.

TECHNICAL FIELD

The present disclosure relates to a connector apparatus configured to connect a tow vehicle with a wagon, and more specifically to a connector apparatus configured to cause wagon braking and acceleration based on tow vehicle braking and acceleration.

BACKGROUND

Trailers or wagons are used in transportation industry to transport goods across long distances. Trailers are typically attached to towing vehicles that drive the trailers. Trailers have cargo space in which users may store goods to be transported. Trailers may also be in the form of Recreation Vehicles (RVs) that may not necessarily be used to transport cargo, but may be used for recreational activities.

Typically, a trailer is attached to a tow vehicle via a tow bar and a tow vehicle hitch. When the tow vehicle travels at a substantially constant speed and a linear direction of motion, the tension/compression forces and/or side forces at the tow vehicle hitch are manageable. However, when the tow vehicle accelerates or decelerates (abruptly or otherwise) or during an off-nominal tow vehicle operation, destabilizing forces (over and above the tow bar weight) may be generated by the trailer at the tow vehicle hitch, which may result in operational risk to the tow vehicle stability and safety concerns for the occupants of the tow vehicle and/or the trailer.

Many modern trailers, especially those with Electric Vehicle (EV) chassis, include electronic control systems that automatically apply brakes or provide throttle to the trailer based on the tow vehicle movement. However, there are known instances of the destabilizing forces on the tow vehicle hitch getting accentuated due to poorly timed throttle or wheel braking commands generated by the trailer electronic control system and/or system malfunction, when the tow vehicle accelerates or decelerates or operates in an off-nominal scenario.

Therefore, an apparatus is required that assists in reducing the destabilizing forces at the tow vehicle hitch and enables efficient trailer electronic control system operation.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
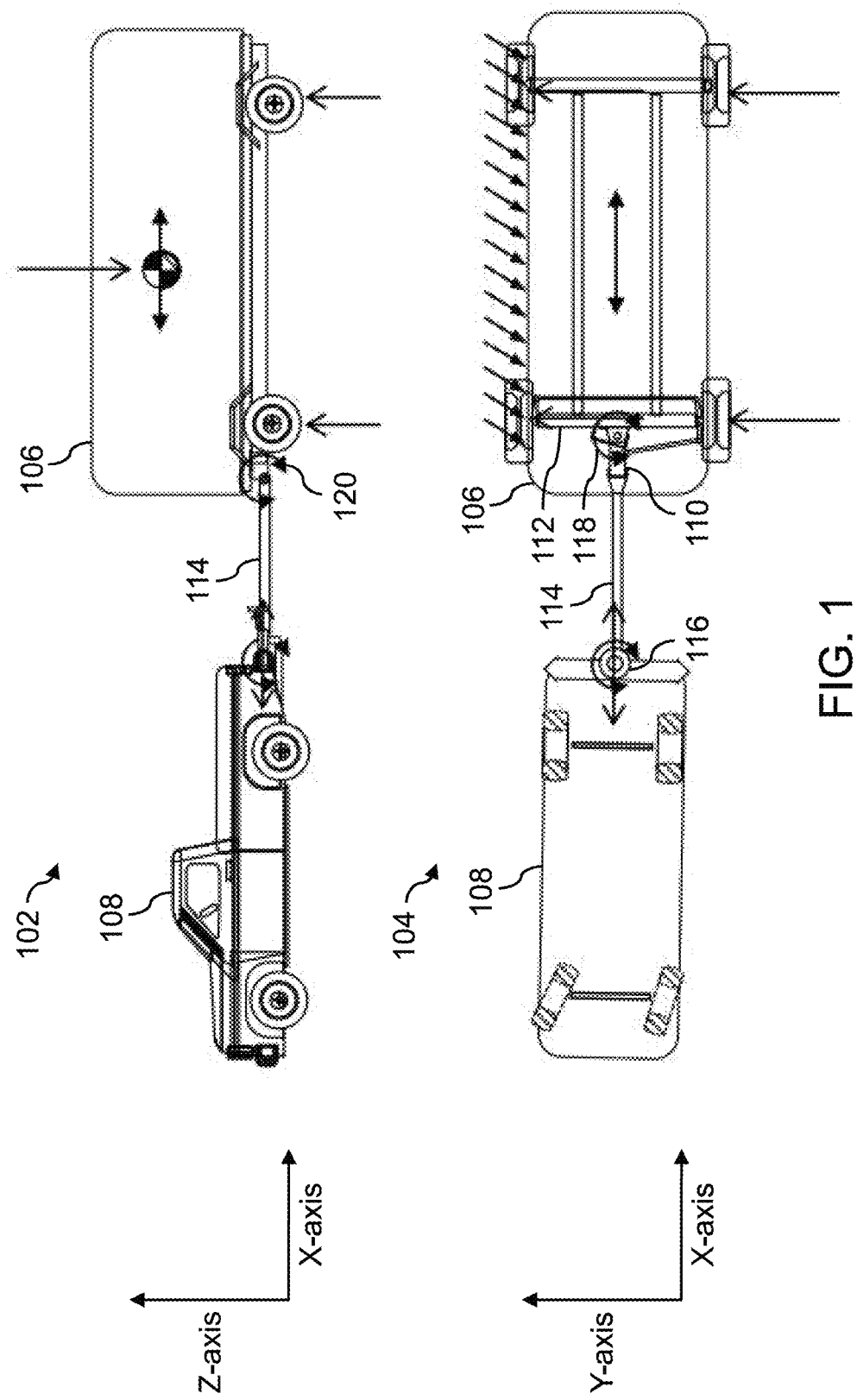
FIG. 1 depicts side and bottom views of a wagon-style trailer connected to a tow vehicle in accordance with the present disclosure.

The present disclosure is directed to a connector apparatus configured to connect a tow vehicle with a trailer/wagon. The trailer may include an Electric Vehicle (EV) chassis having its own EV chassis microprocessor, EV/trailer wheels, braking system, and/or other security features. The apparatus may be communicatively coupled with the EV chassis microprocessor (directly or via a trailer/wagon microprocessor), and may be configured to transmit signals to the EV chassis microprocessor/wagon microprocessor to control trailer wheel operation, based on the tow vehicle movement. For example, the apparatus may transmit a signal to the wagon microprocessor to cause trailer wheel braking when the tow vehicle may be decelerating. Similarly, the apparatus may transmit a signal to the wagon microprocessor to provide throttle (forward or reverse) to the trailer when the tow vehicle may be accelerating.

In some aspects, the apparatus may include a first portion and a second portion that may be configured to engage with each other. The second portion may be partially inserted in the first portion, and configured to move horizontally (e.g., in forward or backward direction) relative to or along a first portion longitudinal axis. The first portion may be attached to a center portion of an EV chassis front axle, and the second portion may be attached to a tow bar, which itself may be attached to the tow vehicle. When the tow vehicle accelerates, a tension force may be generated in the tow bar that causes the tow bar to "pull" the second portion towards the tow vehicle, thereby causing the second portion to move in a first direction (e.g., a forward direction) in the first portion along the first portion longitudinal axis. Similarly, when the tow vehicle decelerates, a compression force may be generated in the tow bar that causes the tow bar to "push" the second portion away from the tow vehicle, thereby causing the second portion to move in a second direction (e.g., a backward direction) in the first portion along the first portion longitudinal axis.

The apparatus may further include a force sensing unit (or a sensor unit) that may be configured to determine a distance and a direction of second portion longitudinal movement in the first portion when the second portion moves. Responsive to determining the distance and the direction, the sensor unit may generate a signal based on the determined distance and direction. The sensor unit may further transmit the signal to the wagon microprocessor.

The wagon microprocessor may obtain the signal from the sensor unit and correlate the signal with a direction of tow vehicle movement (e.g., a forward or reverse tow vehicle movement). The wagon microprocessor may then generate a command signal to either apply brakes or provide throttle (forward or backward) to the trailer, based on the correlation. The wagon microprocessor may then transmit the command signal to the EV chassis microprocessor, which may apply brakes or provide throttle to the trailer based on the command signal. Applying brakes or throttle to the trailer ensures that the trailer "mimics" the tow vehicle movement, thereby relieving the tension or compression forces at the tow bar (and a tow vehicle hitch connecting the tow bar to the tow vehicle).

In some aspects, the apparatus may further include one or more compression springs disposed in the first portion that may be compressed by the second portion, when the second portion moves in the first portion. The sensor unit may be configured to determine a length of spring contraction when the second portion moves, and generate the signal based on the determined length of spring contraction.

In additional aspects, the sensor unit may include one or more load cells that may measure the second portion movement distance in the first portion, when the second portion moves. The apparatus may further include a shock absorber, an accelerometer and/or an inclinometer that may augment sensor unit operation.

The present disclosure discloses a connector apparatus that provides stable connection between a tow vehicle and a trailer. The apparatus enables the wagon microprocessor and/or the EV chassis microprocessor to efficiently control trailer wheel movement, so that the trailer "mimics" the tow vehicle movement. The apparatus structure ensures that the trailer and tow vehicle connection remains stable, even when the tow vehicle may be operating in off-nominal scenarios.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts a side view 102 and a bottom view 104 of a wagon-style trailer 106 (or a first vehicle) connected to a tow vehicle 108 (or a second vehicle) in accordance with the present disclosure. FIG. 1 specifically depicts load distribution of loads experienced by the trailer 106 and the connection connecting the trailer 106 and the tow vehicle 108, when the tow vehicle 108 moves.

The trailer 106 may be connected with the tow vehicle 108 via a connector apparatus 110 (or apparatus 110), shown in the bottom view 104. In some aspects, an apparatus distal end may be connected with a front axle 112 of the trailer 106 and an apparatus proximal end may be connected with a tow bar 114 (which may be a conventional rigid tubular member). Specifically, the apparatus proximal end may be connected with a tow bar distal end. Further, a tow bar proximal end may be connected with a tow vehicle hitch 116, which in turn may be connected to or be a part of the tow vehicle 108. In this manner, the trailer 106 may be connected with the tow vehicle 108 via the apparatus 110, the tow bar 114 and the tow vehicle hitch 116.

In some aspects, the apparatus distal end may be connected with the front axle 112 such that the apparatus 110 may pivot horizontally about a vertical axis. Stated another way, the apparatus distal end may be connected with the front axle 112 such that the apparatus 110 may rotate/pivotally move in the X-Y plane about the Z-axis, as shown by an arrow 118 in the bottom view 104. Since the apparatus 110 may pivot horizontally about the vertical axis, the tow bar 114 (and hence the tow vehicle 108) may also move horizontally in the X-Y plane via the apparatus distal end when the tow vehicle 108 moves (e.g., steers left or right), thereby enabling efficient horizontal movement in the X-Y plane of the tow vehicle 108 about the vertical axis.

In a similar manner, the apparatus proximal end may be connected with the tow bar distal end such that the apparatus 110 may pivot vertically relative to a tow vehicle plane or a trailer plane (or the X-Y plane). Stated another way, the apparatus proximal end may be connected with the tow bar 114 such that the apparatus 110 may rotate/pivotally move in the X-Z plane (or along the Z-axis), as shown by an arrow 120 in the side view 102. Since the apparatus 110 may pivot vertically relative to the tow vehicle plane or the trailer plane, the tow bar 114 (and hence the tow vehicle 108) may also move vertically in the X-Z plane via the apparatus proximal end when the tow vehicle 108 moves (e.g., on an inclined road), thereby enabling efficient vertical movement in the X-Z plane or inclined movement of the tow vehicle 108 relative to the trailer 106.

A person ordinarily skilled in the art may appreciate that when the tow vehicle 108 moves, interface loads may be experienced by the tow vehicle hitch 116 (and the apparatus 110). For example, the tow vehicle hitch 116 may experience tow bar weight, interface forces, side forces due to wind loads, and/or the like. A person ordinarily skilled in the art may further appreciate that a wagon-style trailer (e.g., the trailer 106) demonstrates advantages of safe, stable load carrying and negligible tow bar weight as compared to a conventional trailer (having, e.g., a single axle or closely grouped dual axles). A wagon-style trailer's tow bar is light, thereby exerting less tow bar weight on the tow vehicle hitch 116. Further, in a wagon-style trailer, the interface forces are limited to tension and compression, and the side forces experienced by the tow vehicle hitch 116 are considerably less than the side forces experienced in a conventional trailer. Specifically, a wagon-style trailer's spread axles carry side wind loads, thereby reducing the side forces at the tow vehicle hitch 116. During tow vehicle's off-nominal operation, a wagon-style trailer is generally safer to negotiate, resulting in increased (but still manageable) tension or compression loads on the tow vehicle hitch 116, rather than large and potentially destabilizing side and vertical loads experienced by the tow vehicle hitch 116 with a conventional trailer. Therefore, in the present disclosure, the apparatus 110 is depicted and described as being attached to a wagon-style trailer, e.g., the trailer 106; however, the present disclosure is not limited to such an aspect. Specifically, the apparatus 110 may be attached to steered-axle type wagons/trailers or steered-wheel type wagons/trailers, without departing from the present disclosure scope.

In an exemplary aspect, the trailer 106 may include one or more microprocessors that may be configured to control operation of trailer wheels. Specifically, the microprocessors may cause the trailer wheels to move forward or backward, apply brakes, apply throttle, etc., based on command signals obtained from the tow vehicle 108 and/or the apparatus 110. In some aspects, the apparatus 110 may act as a force measurement unit/system that may detect whether the tow bar 114 (and hence the tow vehicle hitch 116) may be experiencing tension or compression forces. Responsive to detecting the forces experienced by the tow bar 114, the apparatus 110 may generate command signals based on the detected forces, and transmit the command signals to the trailer microprocessor(s) to cause trailer wheel braking or throttle (reverse or forward). Causing the trailer wheel braking or throttle results in the trailer 106 "mimicking" tow vehicle's movement (e.g., tow vehicle acceleration or deceleration), thereby attenuating or relieving the interface forces (e.g., the tension or compression forces) experienced by the tow vehicle hitch 116.

Further apparatus operational and mechanical details are described below in conjunction with subsequent figures.

Figure 2:
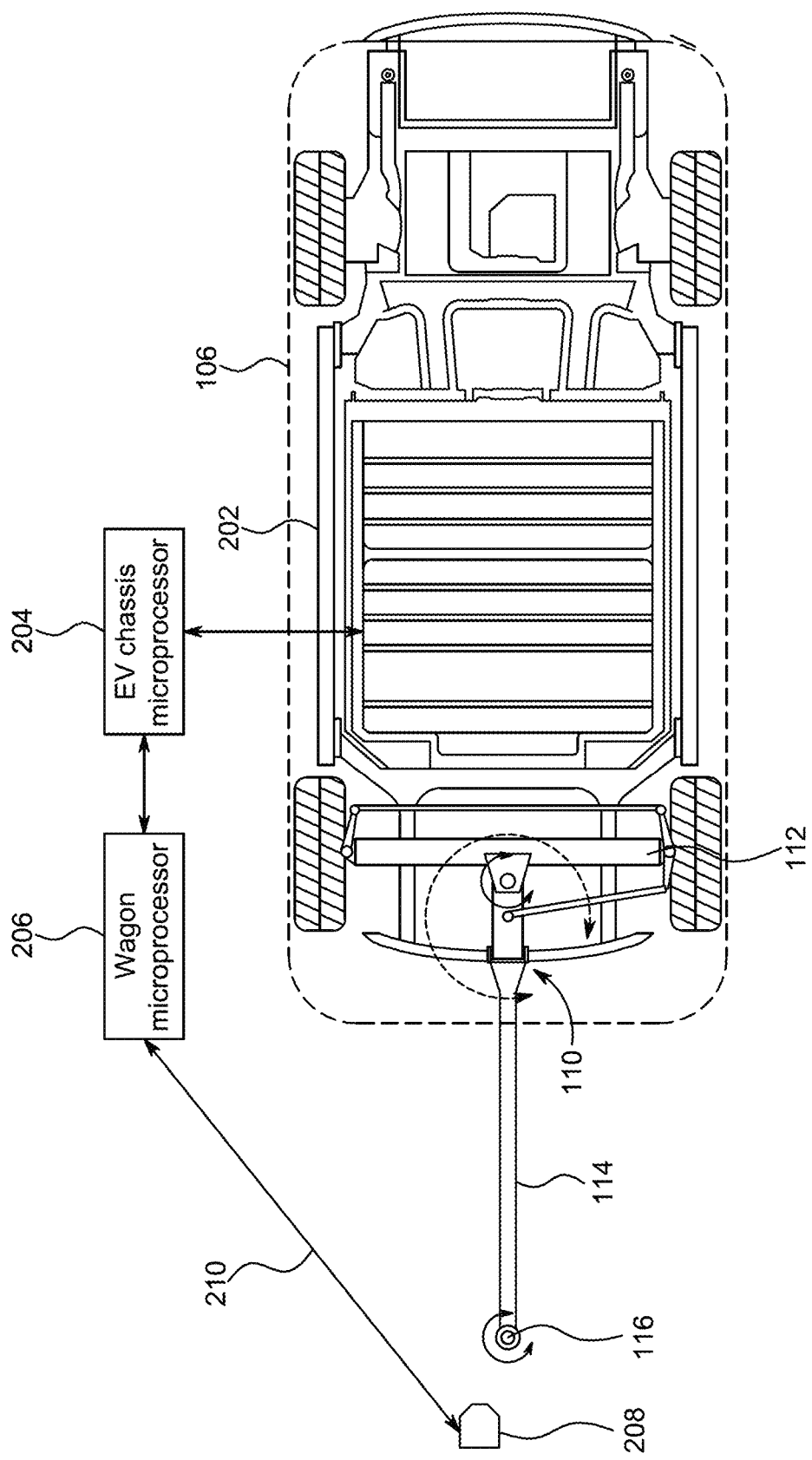
FIG. 2 depicts a bottom view of a connector apparatus connected to a tow bar and a wagon front axle in accordance with the present disclosure.

FIG. 2 depicts a bottom view of the apparatus 110 connected to the tow bar 114 and the front axle 112 in accordance with the present disclosure. In an exemplary aspect, the trailer 106 may include an Electric Vehicle (EV) chassis 202 having its own EV chassis microprocessor 204, drive and automatic braking system (ABS), suspension system, EV or trailer wheels, and/or other safety features. The EV chassis 202 may be configured to control the trailer wheels based on commands obtained from the EV chassis microprocessor 204. For example, the EV chassis 202 may apply brakes or provide throttle to (or steer) the trailer 106 based on the commands obtained from the EV chassis microprocessor 204. In this manner, the trailer 106 may act as an autonomous vehicle that may not be required to be "pulled" by the tow vehicle 108, but may instead move (and stop) on its own based on the commands provided by the EV chassis microprocessor 204.

In some aspects, the EV chassis microprocessor 204 may be communicatively coupled (e.g., via a Controller Area Network (CAN) bus connector/interface) with a trailer or wagon microprocessor 206, which itself may be communicatively coupled (wirelessly or via a wired connection) with the apparatus 110 and a data interface port/trailer connector 208. In an exemplary aspect, the wagon microprocessor 206 may be communicatively coupled with the trailer connector 208 via a wire harness 210. The trailer connector 208 may be connected with the tow vehicle 108 (e.g., to a tow vehicle T-connector) and/or the tow bar 114, and may be configured to transmit information associated with tow vehicle operational modes to the wagon microprocessor 206. The information associated with the tow vehicle operational modes may indicate whether the tow vehicle 108 is in an engine ON or OFF state, tow vehicle direction of movement (i.e., forward or reverse movement), left turn/right turn indicator status, brake indicator status, and/or the like. The wagon microprocessor 206 may transmit the received information to the EV chassis microprocessor 204, which in turn may control trailer operation based on the received information. For example, if the tow vehicle 108 is moving forward and the left turn indicator is turned ON, the EV chassis microprocessor 204 may "mimic" the tow vehicle operation and cause the trailer 106 to move forward and the trailer left turn indicator to switch ON.

In additional or alternative aspects, the tow vehicle 108 and the trailer 106 may each include a custom trailer connector capable of sharing data over and above a standard t-connector, providing interface force and direction, battery charge levels along with additional health, status and performance hardline data between the tow vehicle 108 and the trailer 106 to optimize overall safety, driving and battery performance.

Furthermore, in additional or alternative aspects, the trailer 106 may include an aft trailer hitch for mechanical connection and a standard t-connector or the custom trailer connector above a standard t-connector for communicative coupling with a second trailer (not shown) serially attached as a three-vehicle, the tow vehicle 108—the trailer 106—the second trailer train, with both wagon style trailers (trailer 106 and the second trailer) comprising characteristics as described in the immediate wagon-style trailer specification with optimized safety, driving and battery performance capabilities.

As depicted in FIG. 2 and described above in conjunction with FIG. 1, the apparatus 110 may be pivotally connected to a front axle center portion of the EV chassis 202. The apparatus 110 may act as a force measurement system ruggedized to accommodate off-nominal tow vehicle operation, and configured to convert the forces/loads detected by the apparatus 110 into command signals that are sent to the EV chassis microprocessor 204 (via the wagon microprocessor 206) to cause trailer braking or throttle. As an example, if the apparatus 110 detects a tension force in the tow bar 114, the apparatus 110 may transmit a "tension command signal" to the wagon microprocessor 206/EV chassis microprocessor 204. Responsive to receiving the tension command signal from the apparatus 110, the wagon microprocessor 206/EV chassis microprocessor 204 may correlate the tension command signal with the direction of tow vehicle movement (as determined via the information received from the trailer connector 208), to determine whether throttle (reverse or forward) or brakes are required to be applied to the trailer wheels to relieve the tension force in the tow bar 114 (and hence at the tow vehicle hitch 116). For example, if the tow vehicle 108 may be moving forward, the EV chassis microprocessor 204 may determine that throttle is required to be provided to the trailer 106 to relieve the tension force in the tow bar 114 (and hence at the tow vehicle hitch 116), responsive to receiving the tension command signal from the apparatus 110.

Although FIG. 2 depicts two separate microprocessors, i.e., the wagon microprocessor 206 and the EV chassis microprocessor 204, in some aspects, there may be just a single microprocessor (e.g., the wagon microprocessor 206) that may be configured to receive information/inputs/signals from the apparatus 110 and the trailer connector 208, and control EV chassis operation (including operational mode selection, e.g., ON/OFF, forward/reverse movement; throttle and brake commands and degree, and/or the like).

In some aspects, when the tow vehicle 108 may be moving forward (as determined via the information received from the trailer connector 208) and the apparatus 110 detects a tension force in the tow bar 114 above a predefined threshold (e.g., deadband), the EV chassis microprocessor 204/wagon microprocessor 206 may provide throttle to the trailer 106 to relieve the tension force. On the other hand, when the tow vehicle 108 may be moving forward (as determined via the information received from the trailer connector 208) and the apparatus 110 detects a compression force above the predefined threshold, the EV chassis microprocessor 204/wagon microprocessor 206 may apply brakes to the trailer 106 to relieve the compression force.

Opposite operation may be implemented when the tow vehicle 108 may be moving in reverse. Specifically, when the tow vehicle 108 may be moving in reverse (as determined via the information received from the trailer connector 208) and the apparatus 110 detects a tension force in the tow bar 114 above the predefined threshold, the EV chassis microprocessor 204/wagon microprocessor 206 may apply brakes to the trailer 106 to relieve the tension force. Further, when the tow vehicle 108 may be moving in reverse (as determined via the information received from the trailer connector 208) and the apparatus 110 detects a compression force above the predefined threshold, the EV chassis microprocessor 204/wagon microprocessor 206 may provide throttle to the trailer 106 to relieve the compression force.

In this manner, the apparatus 110, along with the EV chassis microprocessor 204/wagon microprocessor 206, facilitate in relieving the tension or compression force/loads at the tow bar 114 and hence at the tow vehicle hitch 116, thereby enhancing stability of tow vehicle operation and connection between the tow vehicle 108 and the trailer 106.

Apparatus mechanical details are described below in conjunction with the subsequent figures.

Figure 3:
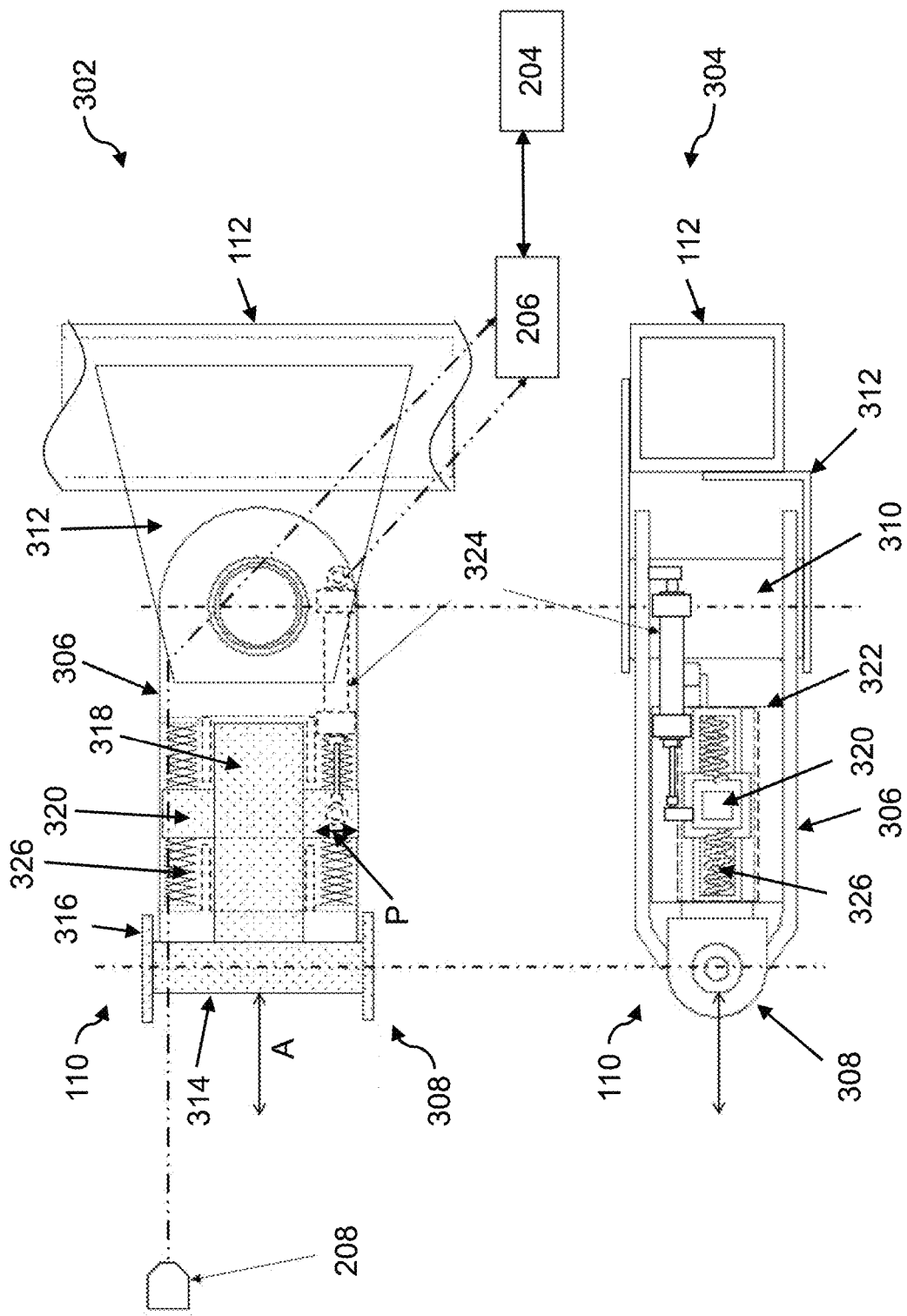
FIG. 3 depicts top and side views of a first connector apparatus in an assembled state in accordance with the present disclosure.
Figure 4:
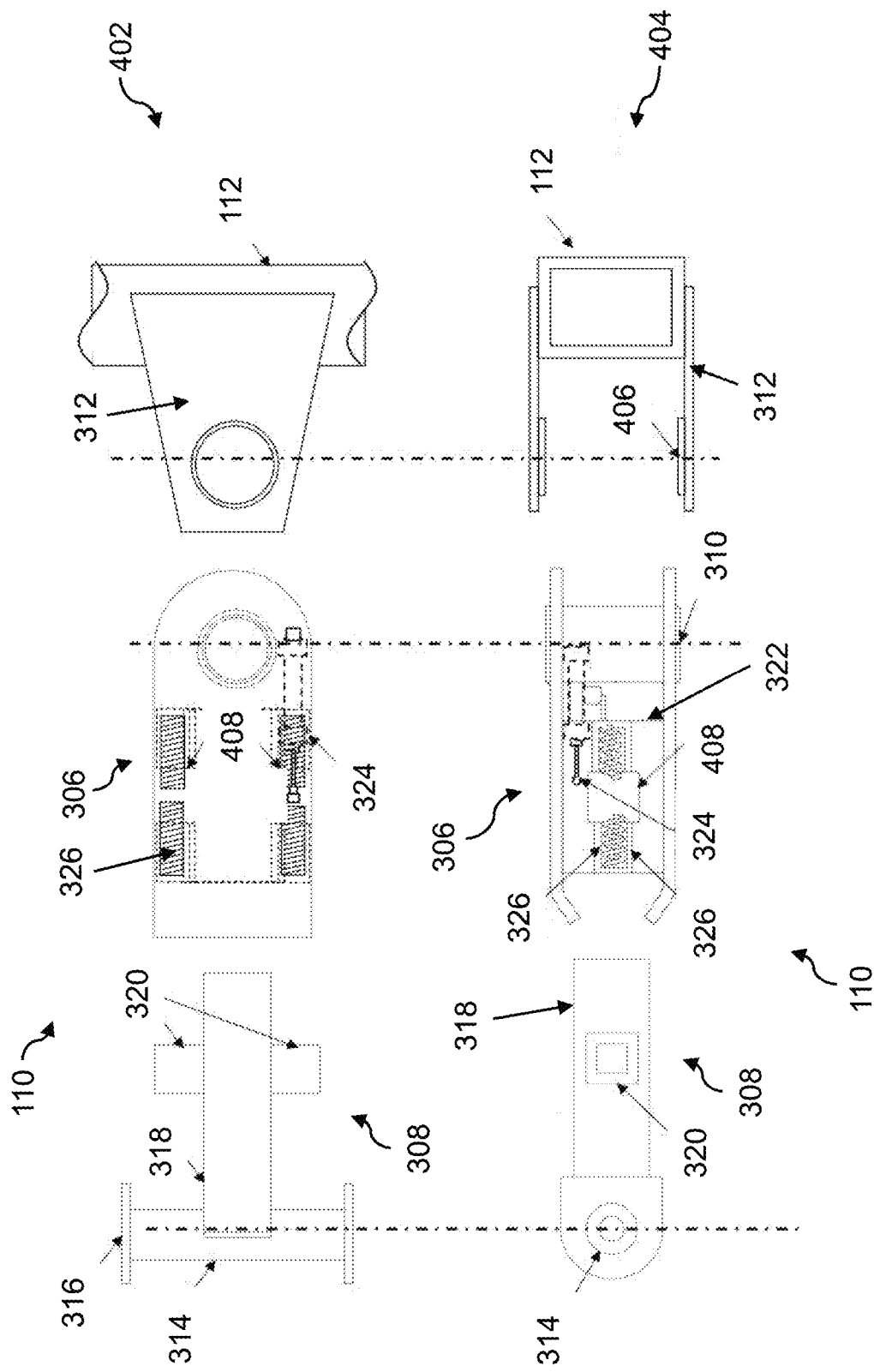
FIG. 4 depicts top and side views of the first connector apparatus in a disassembled state in accordance with the present disclosure.
Figure 5:
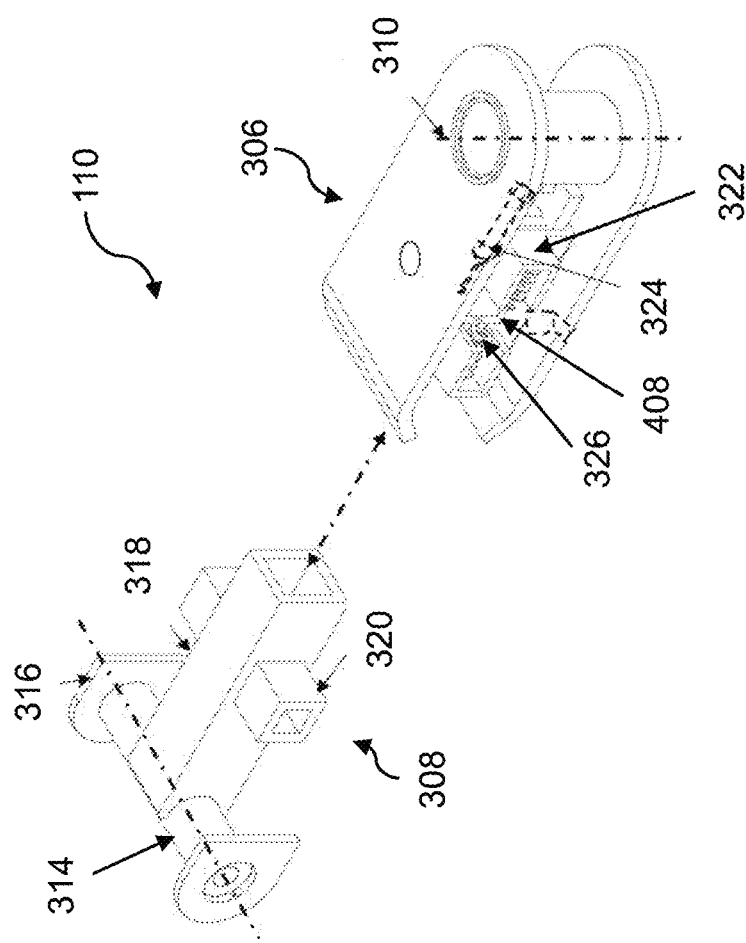
FIG. 5 depicts a perspective view of the first connector apparatus in a disassembled state in accordance with the present disclosure.

FIG. 3 depicts a top view 302 and a side view 304 of the apparatus 110 in an assembled state in accordance with the present disclosure. FIG. 3 will be described in conjunction with FIGS. 4 and 5. FIG. 4 depicts a top view 402 and a side view 404 of the apparatus 110 in a disassembled state, and FIG. 5 depicts a perspective view of the apparatus 110 in a disassembled state.

The apparatus 110 may include a first portion 306 (or a "yaw pivot") and a second portion 308 (or a "pitch pivot") that may be configured to engage with each other. The first portion 306 may be connected with the trailer 106, specifically to the front axle 112 (e.g., to the front axle center portion), as described above. In some aspects, the first portion 306 may be connected to the front axle center portion about the vertical axis (i.e., the Z-axis), so that the first portion 306 may be configured to pivot horizontally relative to the trailer longitudinal axis in the X-Y plane, as described above in conjunction with FIG. 1. In an exemplary aspect, a first portion distal end may include a vertical pivot bearing 310 that may be configured to rotatably engage/attach with a bracket bearing 406 of a structural member 312 attached to the front axle center portion. When the vertical pivot bearing 310 rotatably engages/attaches with the bracket bearing 406, the first portion 306 may pivot horizontally about the vertical pivot bearing 310, thereby enabling horizontal pivot movement of the first portion 306 relative to the trailer longitudinal axis in the X-Y plane.

The second portion 308 may be connected to the tow vehicle 108 via the tow bar 114. The second portion 308 may be configured to pivot vertically relative to the tow vehicle plane or the trailer plane (or the X-Y plane), as described above in conjunction with FIG. 1. In some aspects, the tow bar distal end may be pivotally connected about a horizontal axis to a second portion proximal end, and the tow bar proximal end may be pivotally connected to the tow vehicle hitch 116 (as described above). The tow bar distal end may be configured to pivotally rotate vertically (i.e., along the Z-axis) relative to the second portion proximal end. In an exemplary aspect, the second portion proximal end may include a lateral tube 314 that may enable pivotal connection along the horizontal axis between the second portion proximal end and the tow bar distal end via lateral tube ends 316. The lateral tube ends 316 may be rotatably connected with the tow bar distal end via unthreaded bolt or other pin or with conventional bearing.

The second portion 308 may further include a first elongated part 318 (or a first elongated tube/rod) and a second elongated part 320 (or a second elongated tube/rod). The first and second elongated parts 318, 320, along with the lateral tube 314, may form an integrated structure of the second portion 308. In some aspects, a first elongated part longitudinal axis may be disposed perpendicular to a second elongated part longitudinal axis, as shown in FIGS. 3, 4 and 5. Further, the second elongated part longitudinal axis may be aligned parallel to a lateral tube longitudinal axis, and the first elongated part longitudinal axis may be aligned parallel to a first portion longitudinal axis.

In the assembled state, the second portion 308 may be engaged with (or inserted in) the first portion 306, and configured to move horizontally (i.e., in forward or backward direction) relative to or along the first portion longitudinal axis when the second portion 308 may be attached to the tow bar 114, the first portion 306 may be attached to the front axle 112, and the tow vehicle 108 may be accelerating or decelerating. The second portion horizontal movement relative to or along the first portion longitudinal axis is shown by a double-sided arrow "A" in FIG. 3.

As an example, when the tow vehicle 108 may be moving forward and accelerating, the tow bar 114 may "pull" the second portion 308 towards the tow vehicle 108 (or generating tension force in the tow bar 114 and the tow vehicle hitch 116), thereby causing the second portion 308 to move "forward" towards the first portion proximal end when the second portion 308 may be engaged with the first portion 306. In a similar manner, when the tow vehicle 108 may be moving forward and decelerating, the tow bar 114 may "push" the second portion 308 away from the tow vehicle 108 (or generating compression force in the tow bar 114 and the tow vehicle hitch 116), thereby causing the second portion 308 to move "backwards" towards the first portion distal end when the second portion 308 may be engaged with the first portion 306.

In some aspects, the first portion 306 may include a lock box 322 that may be configured to enable a second portion horizontal movement (i.e., forward and backward movement) in the first portion 306, but disable a second portion vertical movement (i.e., upward and downward movement) and a second portion lateral movement (i.e., left and right movement) in the first portion 306. Stated another way, when the second portion 308 may be engaged with or inserted into the first portion 306 in the assembled state, the second portion 308 may only move forward and backward relative to the first portion 306 (and not up/down or left/right) due to the lock box presence in the first portion 306.

In some aspects, the lock box 322 may be disposed inside the first portion 306 (i.e., between first portion top and bottom walls). The lock box 322 may be shaped as a hollow cuboid, with an opening (not shown) in a lock box proximal end (e.g., on a center portion of a lock box front wall) through which the first elongated part 318 may move forward and backward relative to the first portion 306. In some aspects, the lock box 322 may additionally include another opening in a lock box distal end (e.g., on a center portion of a lock box rear wall) that may provide freedom of forward and backward movement to the first elongated part 318 relative to the first portion 306.

The first elongated part 318 and the second elongated part 320 may be partially disposed inside the lock box 322, when the first and second portions 306, 308 may be in the assembled state. Specifically, a predefined length of the first elongated part 318 in proximity to a first elongated part proximal end may be outside of the lock box 322 when the first and second portions 306, 308 may be in the assembled state, so that the first elongated part 318 may conveniently move forward and backward relative to the first portion 306 when the tow vehicle 108 accelerates or decelerates.

In some aspects, the lock box 322 may further include apertures 408 disposed on center portions of left and right walls of the lock box 322, as depicted in FIGS. 4 and 5. A portion "P" (shown in FIG. 3) of the second elongated part 320 may extend through the lock box 322 or protrude out from the lock box 322 via the apertures 408, when the first and second portions 306, 308 may be engaged with each other (or when the second portion 308 may be inserted in the first portion 306). In some aspects, aperture walls act as a positive top limiting the second portion horizontal movement below a predefined distance limit when the second portion 308 moves relative to or along the first portion longitudinal axis. Specifically, when the tow vehicle 108 accelerates or decelerates abruptly (e.g., during off-nominal tow vehicle operation), the tow bar 114 causes the second portion 308 to move forward or backward relative to or along the first portion longitudinal axis, thereby causing the second elongated part 320 to move closer to one of the aperture walls (e.g., front aperture wall when the second elongated part 320 may be moving forward towards the first portion proximal end, or rear aperture wall when the second elongated part 320 may be moving backwards towards the first portion distal end). As the second elongated part 320 moves towards and touches the aperture walls, the second elongated part forward or backward movement may be stopped by the aperture walls, thereby stopping the second portion movement in the first portion 306 relative to or along the first portion longitudinal axis. Stopping the second portion movement in the first portion 306 (especially during off-nominal tow vehicle operation when the second portion movement may be abrupt and accentuated) may prevent the apparatus 110 from damage.

In further aspects, the apparatus 110 may include a sensor unit 324 connected with the first portion 306 and the second portion 308. The sensor unit 324 may be configured to determine a distance and a direction of the second portion horizontal movement in the first portion 306 when the second portion 308 moves relative to the first portion longitudinal axis (e.g., due to tension or compression forces/loads generated at the tow bar 114 due to tow vehicle acceleration or deceleration). For example, the sensor unit 324 may determine than the second portion 308 may have moved 10 mm in a backward direction in the first portion 306 relative to a second portion nominal position, when the second portion 308 moves in the first portion 306. Responsive to determining the distance and the direction, the sensor unit 324 may generate a signal (or a voltage output) based on the determined distance and direction, and then transmit the generated signal to the wagon microprocessor 206.

In some aspects, the sensor unit 324 may be an analog or digital sensor, a linear potentiometer, a Hall Effect sensor, and/or the like.

The wagon microprocessor 206 may obtain the signal from the sensor unit 324 and also the information associated with the tow vehicle operational modes (e.g., the tow vehicle movement direction) from the trailer connector 208, as described above in conjunction with FIG. 2. The wagon microprocessor 206 may then correlate the signal and the tow vehicle movement direction, and generate a command signal based on the correlation. The wagon microprocessor 206 may then transmit the command signal to the EV chassis microprocessor 204, which may perform a predefined action based on the command signal. For example, the EV chassis microprocessor 204 may either cause the EV chassis 202 to apply brakes to the trailer 106 or cause the EV chassis 202 to provide throttle to the trailer 106, based on the command signal. As described above, the wagon microprocessor 206 may generate the command signal so that the tension or compression forces/loads experienced at the tow bar 114 and the tow vehicle hitch 116 may be reduced, thereby enhancing operational stability associated with tow vehicle 108 and the trailer 106.

As an example, when the signal obtained from the sensor unit 324 indicates that the second portion 308 may have moved 10 mm in the backward direction in the first portion 306 and the information obtained from the trailer connector 208 indicates that the tow vehicle 108 may be moving forward, the wagon microprocessor 206 may determine that the tow vehicle 108 may be decelerating and hence compression forces/loads may be acting on the tow bar 114 and the tow vehicle hitch 116. Responsive to such determination, the wagon microprocessor 206 may generate and transmit a "brake" command signal to the EV chassis microprocessor 204, which may cause the EV chassis 202 to apply brakes to the trailer wheels responsive to receiving the brake command signal.

As another example, when the signal obtained from the sensor unit 324 indicates that the second portion 308 may have moved 10 mm in a forward direction in the first portion 306 and the information obtained from the trailer connector 208 indicates that the tow vehicle 108 may be moving forward, the wagon microprocessor 206 may determine that the tow vehicle 108 may be accelerating and hence tension forces/loads may be acting on the tow bar 114 and the tow vehicle hitch 116. Responsive to such determination, the wagon microprocessor 206 may generate and transmit a "throttle" command signal to the EV chassis microprocessor 204, which may cause the EV chassis 202 to provide throttle to the trailer 106 responsive to receiving the throttle command signal. An opposite process may be implemented when the tow vehicle 108 may be reversing/backing.

In some aspects, the degree of braking or throttle applied to the trailer 106 may depend on (or may be proportional to) the distance moved by the second portion 308 in the first portion 306. Specifically, in some aspects, the apparatus 110 may further include one or more springs 326 (e.g., compression springs, gas springs, torsion springs, or any type of springs) connected between the first portion 306 and the second portion 308. In the exemplary aspect depicted in FIGS. 3, 4 and 5, the springs 326 are disposed inside the first portion 306 (specifically inside the lock box 322). The apparatus 110 may include four springs 326 disposed in lock box 322 (as shown in the views 302 and 402). A first spring may be disposed in proximity to a left front lock box interior corner, a second spring may be disposed in proximity to a right front lock box interior corner, a third spring may be disposed in proximity to a left rear lock box interior corner, and a fourth spring may be disposed in proximity to a right rear lock box interior corner. The example spring arrangement and count depicted in the views 302 and 402 should not be construed as limiting, and the apparatus 110 may include more or less than four springs 326.

In some aspects, the springs 326 may be disposed in the first portion 306 and connected between the first and second portions 306, 308, such that when the second portion 308 moves horizontally forward or backward relative to the first portion longitudinal axis, the portion "P" of the second elongated part 320 may engage with and compress one or more springs 326. The sensor unit 324 may be configured to determine a length of spring compression/contraction when the second portion 308 moves and compresses the springs 326, and generate the signal based on the determined length.

In some aspects, one end of the springs 326 may be attached to the lock box front and rear walls via metal keepers (not shown) or any other attachment means, and the other ends of the springs 326 may be disposed in proximity to the apertures 408 so that the portion "P" of the second elongated part 320 may conveniently compress the springs 326 (specifically the springs' other ends) when the second portion 308/second elongated part 320 moves in the first portion 306 (e.g., due to the tow vehicle acceleration or deceleration operation).

A person ordinarily skilled in the art may appreciate that the force exerted by the second portion 308 (specifically by the portion "P" of the second elongated part 320) on the springs 326 may be proportional to the tension or compression force/load experienced by the tow bar 114 and the tow vehicle hitch 116. Further, the force exerted by the second portion 308 on the springs 326 may be expressed with a mathematical expression, $F=K*x$, where F is the force, K is the spring constant and x is the longitudinal distance moved by the second portion 308 in the first portion 306 (or the length of spring contraction), as determined by the sensor unit 324. Since the sensor unit 324 generates the signal based on the length of spring contraction "x", the generated signal is proportional to the force "F" exerted by the second portion 308 on the springs 326, which itself is proportional to the tension or compression force/load experienced by the tow bar 114 and the tow vehicle hitch 116, as described above. Therefore, the signal generated by the sensor unit 324 is proportional to the tension or compression force/load experienced by the tow bar 114 and the tow vehicle hitch 116.

Since the wagon microprocessor 206 generates the command signals for the EV chassis microprocessor 204 based on the signal generated by the sensor unit 324, the command signals may be proportional to or based on the tension or compression force/load experienced by the tow bar 114 and the tow vehicle hitch 116. Further, since the EV chassis microprocessor 204 causes the EV chassis 202 to provide throttle or brakes to the trailer 106 based on the command signals obtained from the wagon microprocessor 206, the degree of throttle or brake may be proportional to the tension or compression force/load experienced by the tow bar 114 and the tow vehicle hitch 116. Therefore, if greater tension or compression force/load is experienced by the tow bar 114 and the tow vehicle hitch 116, the EV chassis 202 may apply greater throttle or brakes to the trailer 106, thereby quickly reducing the tension or compression force/load experienced by the tow bar 114 and the tow vehicle hitch 116.

In some aspects, the surfaces associated with the second portion 308 and the first portion 306 (e.g., the first and second elongated parts 318, 320, the lock box walls, etc.) may be coated with bearing material to reduce friction, such as bronze (or similar) metal, high-density plastic linear and/or roller bearings. Further, the coating may be corrosion-resistant to prevent the apparatus 110 from damage.

Although the description above describes an aspect where the trailer 106 has the EV chassis 202, the present disclosure is not limited to such as aspect. In alternative aspects, the trailer 106 may include an internal combustion engine (ICE) combined with electric drive (hybrid electric) automotive chassis. In yet another aspect, the trailer 106 may include automotive chassis powered by ICE drive systems or other chemical drive systems, without departing from the present disclosure scope.

Figure 6:
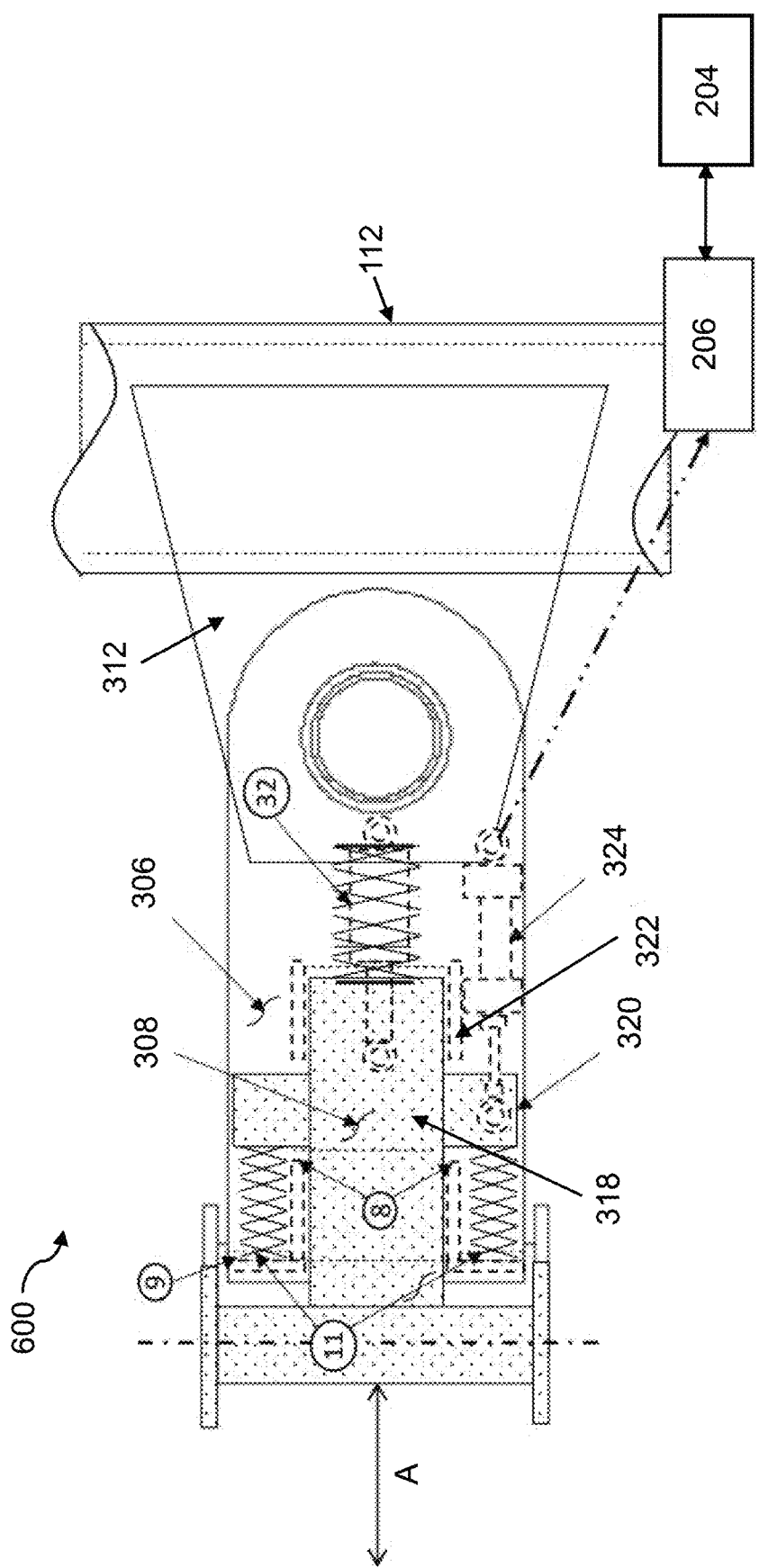
FIG. 6 depicts a top view of a second connector apparatus in accordance with the present disclosure.

FIG. 6 depicts a top view of a connector apparatus 600 (or apparatus 600) in accordance with the present disclosure. The apparatus 600 may be similar to the apparatus 110 described above, and may include the first portion 306, the second portion 308, the first and second elongated parts 318, 320, the sensor unit 324, and/or the like, as shown in FIG. 6. The apparatus 600 may further include one or more compression springs 11 connected to lock box or first portion front walls via spring retainers 9. The compression springs 11 may be similar to the springs 326 described above; however, the apparatus 600 may include two compression springs 11, instead of four springs 326 included in the apparatus 110. In the exemplary aspect depicted in FIG. 6, one compression spring may be disposed in proximity to a first portion front left corner and another compression spring may be disposed in proximity to a first portion front right corner. One ends of the compression springs 11 may be attached to the lock box or first portion front walls via the spring retainers 9, and other ends of the compression springs 11 may be disposed in proximity to apertures 8, which may be similar to the apertures 408 described above.

In some aspects, the apparatus 600 may further include a strut 32 including coil spring and shock absorber (hereinafter referred to as shock absorber 32). The shock absorber 32 may have the same spring stiffness as the combined stiffness of the compression springs 11. In the exemplary aspect depicted in FIG. 6, one end of the shock absorber 32 is attached to a first portion distal end or rear wall, and the other end of the shock absorber 32 is disposed in proximity to a rear opening of the lock box 322. When the first elongated part 318 moves backwards towards the first portion distal end or rear wall, a first elongated part distal end may touch the shock absorber 32, thereby enabling gradual stopping of the first elongated part movement. In some aspects, the shock absorber 32 may be configured to attenuate the shock loads developed by the tow bar 114 when the second portion 308 moves relative to or along the first portion longitudinal axis, thereby preventing the apparatus 600 from damage and enhancing operational and connection stability between the tow vehicle 108 and the trailer 106.

Remaining structural and functional details associated with the apparatus 600 are similar to the structural and functional details associated with the apparatus 110, and hence are not described again here for the sake of simplicity and conciseness.

Figure 7:
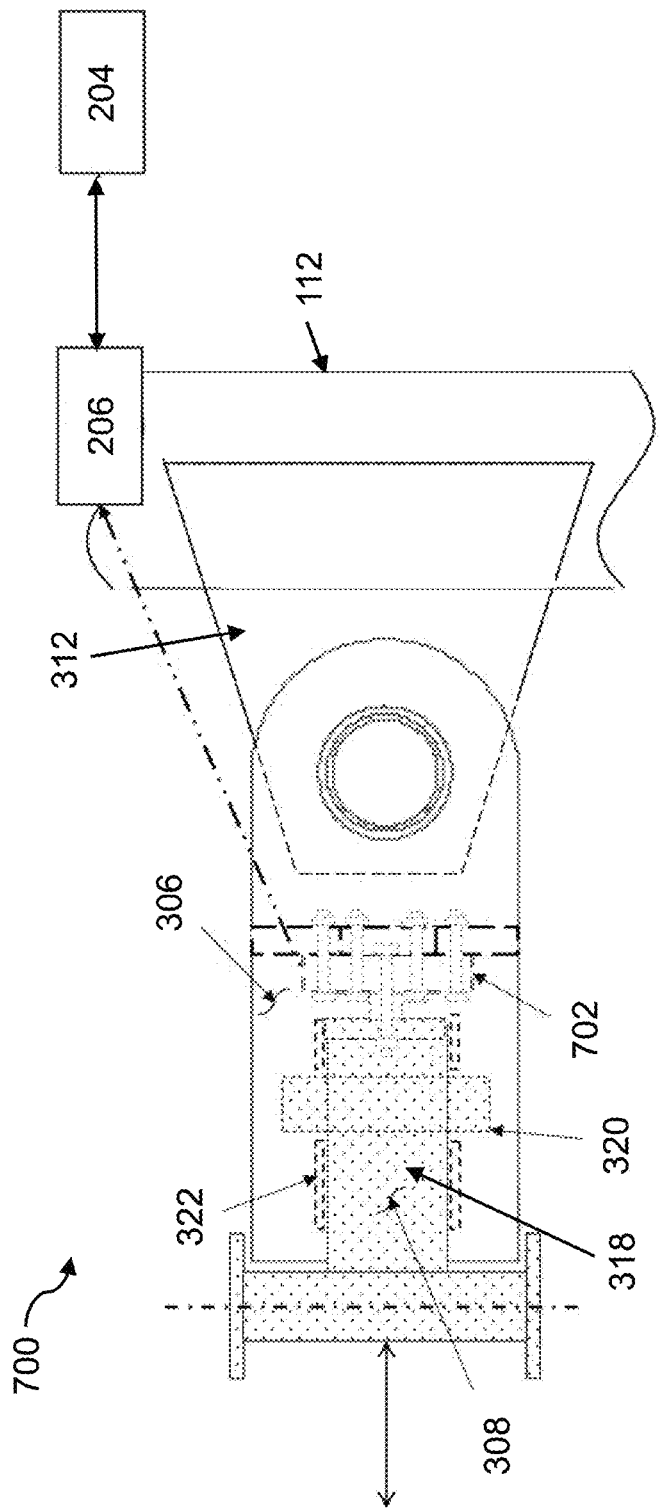
FIG. 7 depicts a top view of a third connector apparatus in accordance with the present disclosure.

FIG. 7 depicts a top view of a connector apparatus 700 (or apparatus 700) in accordance with the present disclosure. The apparatus 700 may be similar to the apparatus 110 described above, and may include the first portion 306, the second portion 308, the first and second elongated parts 318, 320, the lock box 322, and/or the like, as shown in FIG. 7. However, the apparatus 700 may not include the springs 326. The apparatus 700 may instead include a sensor unit 702 including one or more load cells (hereinafter referred to as load cells 702). The load cells 702 may perform similar function as the sensor unit 324, i.e., determine a distance of second portion longitudinal movement in the first portion 306 and generate a signal for the wagon microprocessor 206 based on the determined distance.

In the exemplary aspect depicted in FIG. 7, one end of the load cells 702 is attached to the first portion distal end or rear wall, and the other end of the load cells 702 is disposed in proximity to the rear opening of the lock box 322. When the first elongated part 318 moves backward or forward along the first portion longitudinal axis, the load cells 702 may determine the distance of second portion longitudinal movement in the first portion 306 and generate the signal for the wagon microprocessor 206 based on the determined distance.

The load cells 702 may be configured to measure compression and tension loads while withstanding shock, thermal and other induced loads. In some aspects, the load cells 702 may include a single pancake-style load sensor, designed to take shock loads and be weather tolerant. In alternative aspects, the apparatus 700 may include other styles of load cells or indirect force measurement units, without departing from the present disclosure scope.

Remaining structural and functional details associated with the apparatus 700 are similar to the structural and functional details associated with the apparatus 110, and hence are not described again here for the sake of simplicity and conciseness.

Figure 8:
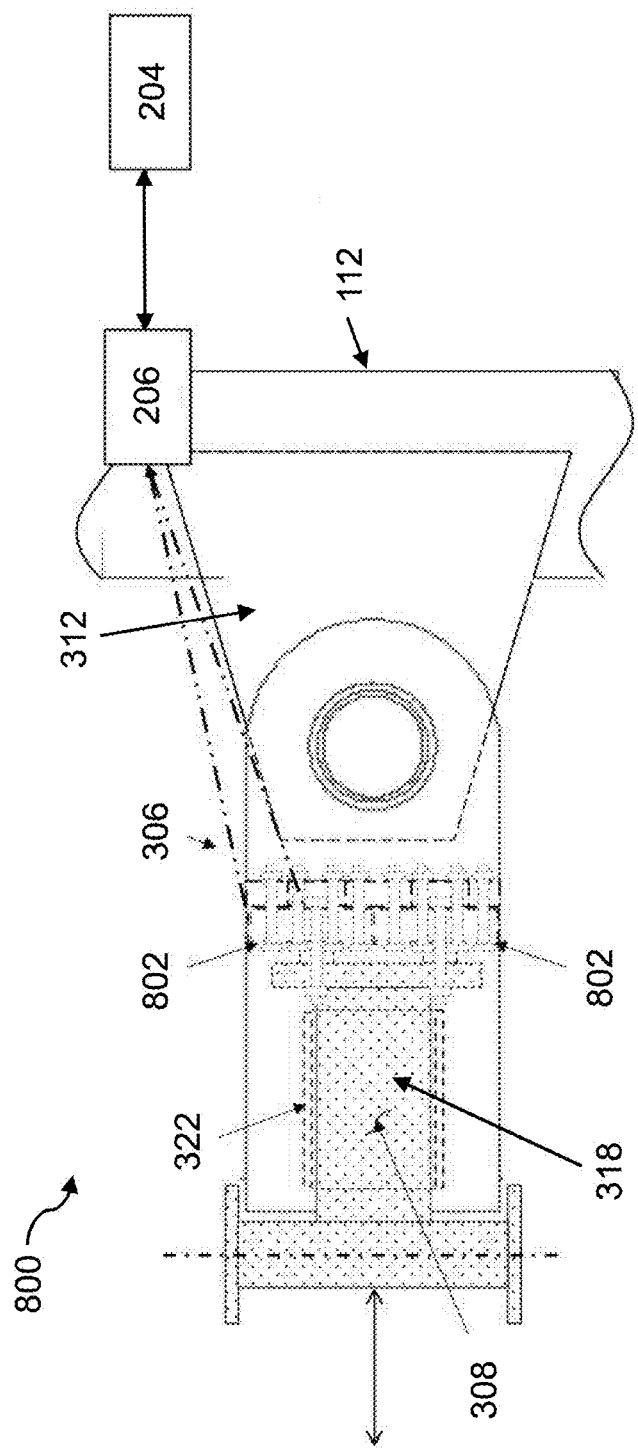
FIG. 8 depicts a top view of a fourth connector apparatus in accordance with the present disclosure.

FIG. 8 depicts a top view of a connector apparatus 800 (or apparatus 800) in accordance with the present disclosure. The apparatus 800 may be similar to the apparatus 700 described above; however, instead of having a single load cell 702, the apparatus 800 may include two or more load cells 802. Multiple load cells provide redundant sensing and structural attachment, eliminating the need for the second elongated part 320 in the lock box 322. Since the second elongated part 320 is not required and included in the apparatus 800, the lock box 322 in the apparatus 800 may not include the apertures 8, 408. Software code or application executing in the wagon microprocessor 206 may manage the redundant load signals and provide redundancy management, caution and warning to the tow vehicle operator as appropriate when one or more sensors/load cells may be compromised.

Remaining structural and functional details associated with the apparatus 800 are similar to the structural and functional details associated with the apparatus 700, and hence are not described again here for the sake of simplicity and conciseness.

Figure 9:
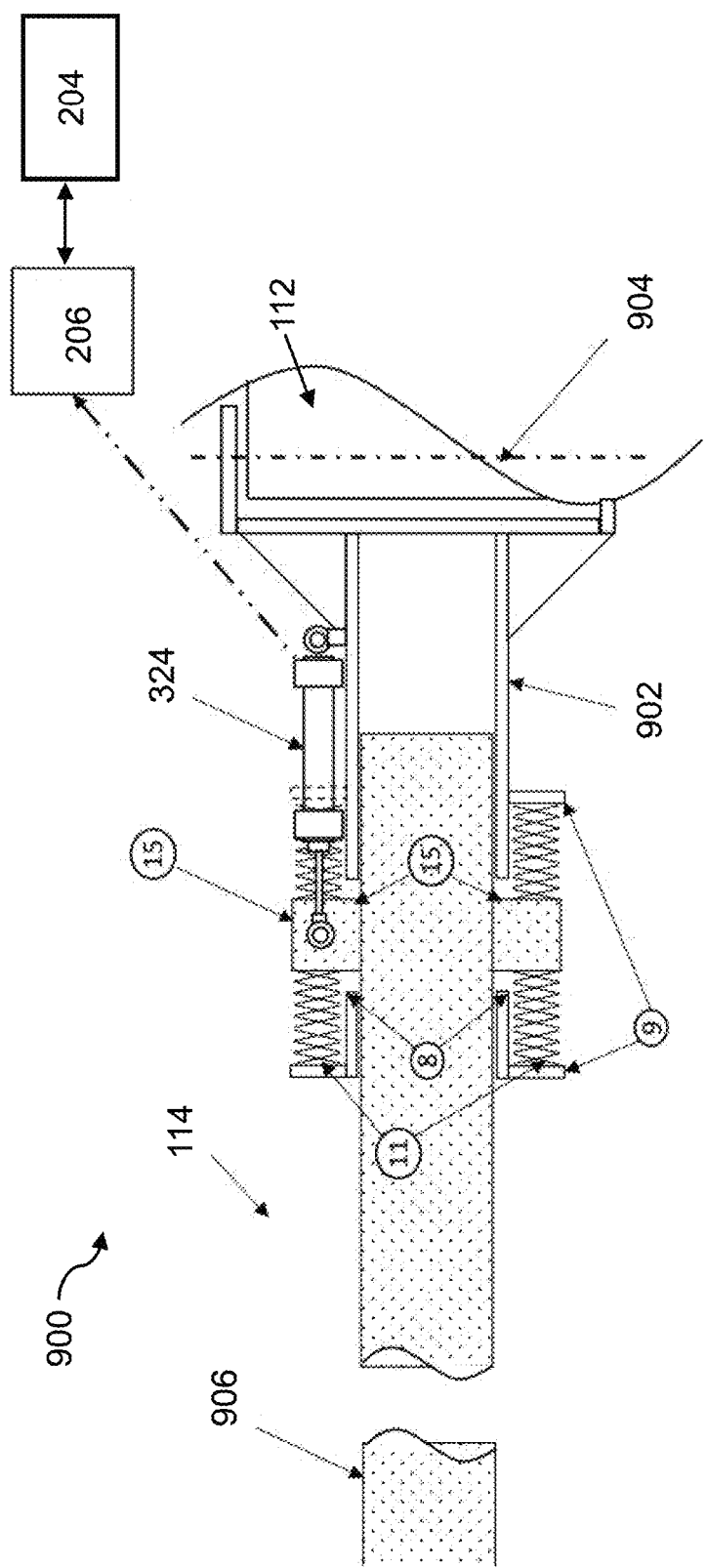
FIG. 9 depicts a top view of a fifth connector apparatus in accordance with the present disclosure.

FIG. 9 depicts a top view of a connector apparatus 900 (or apparatus 900) in accordance with the present disclosure. The apparatus 900 may be similar to the apparatus 110 and the apparatus 600; however, the apparatus 900 may not include the first portion 306. The apparatus 900 may include a hitch box 902 (which may be a tubular member) that may be pivotally attached about a horizontal axis 904 to the front axle 112. The sensor unit 324 may be attached to the hitch box 902 and a second elongated part 15 (which may be same as the second elongated part 320). The hitch box 902 may have an opening in a hitch box proximal end or front end to enable the tow bar 114 to move forward and backward in the hitch box 902. In some aspects, the tow bar distal end may be attached to a hitch bar 906 (or the hitch bar 906 may be part of the tow bar 114) that may be connected with the tow vehicle 108 (specifically with the trailer connector 208).

The hitch box 902 may further include the apertures 8, the compression springs 11 and the spring retainers 9. The functions of these elements are already described above. Further, the second elongated part 15 may be attached to or be a part of the tow bar 114 or the hitch bar 906.

A person ordinarily skilled in the art may appreciate from the description above and FIG. 9 that in the apparatus 900, the function of force measurement is shifted to the tow bar 114. Although the apparatus 900 is shown to include the compression springs 11, in some aspects, the apparatus 900 may additionally or alternatively include load cells, shock absorbers, and/or the like.

In further aspects, the function of force measurement may be replaced by acceleration measurement, either analog or digitally, via an accelerometer and/or an inclinometer (not shown) coupled to the wagon microprocessor 206. In this aspect, the wagon microprocessor 206 generates throttle and brake commands based on signals obtained from the trailer connector 208, indicating forward or reverse tow vehicle mode combined with measured acceleration and incline from the accelerometer and the inclinometer. For example, when the inclinometer indicates that the tow vehicle 108 may be moving uphill and in the forward direction, and the accelerometer indicates that the tow vehicle 108 may be accelerating, the wagon microprocessor 206 may generate throttle command to provide throttle to the trailer 106 equivalent to the tow vehicle acceleration and the acceleration associated with the incline. Similarly, when the inclinometer indicates that the tow vehicle 108 may be moving downhill and in the forward direction, and the accelerometer indicates that the tow vehicle 108 may be accelerating above the acceleration due to the incline, the wagon microprocessor 206 may generate throttle command to provide throttle to the trailer 106 equivalent to a difference between the tow vehicle acceleration and the acceleration due to the incline.

In some aspects, the accelerometer and the inclinometer may be combined into a single analog or solid-state sensor using similar command logic and algorithms. The accelerometer and the inclinometer may be combined with the force measurement units (e.g., the apparatus 110 described above) to provide redundancy or improved EV chassis command and control. In some aspects, additional inputs from velocity sensors, Global Positioning System (GPS) receivers, and other Global Navigation Satellite System (GNSS) receivers may be provided to the wagon microprocessor 206 to further enhance EV chassis control operation.

Figure 10:
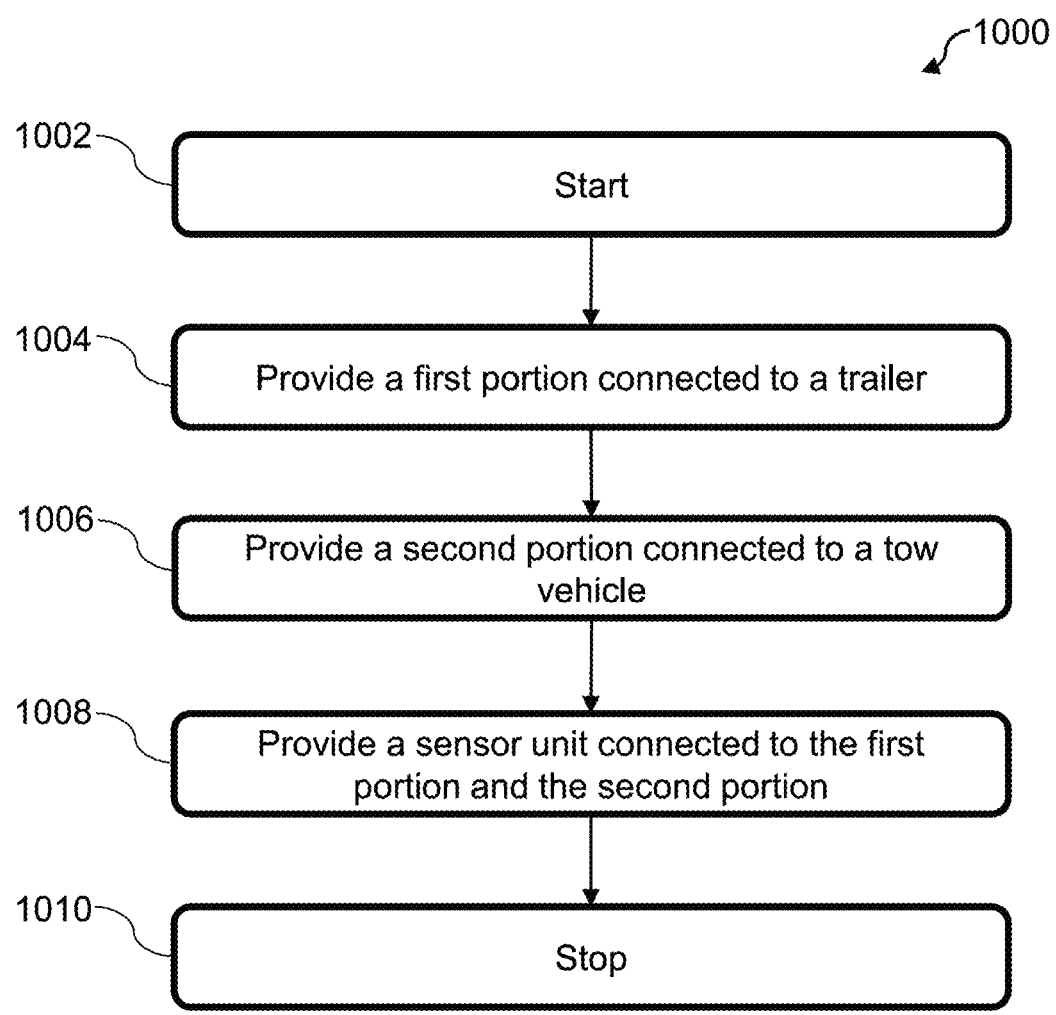
FIG. 10 depicts a flow diagram of a method to enable connection between a tow vehicle and a trailer in accordance with the present disclosure.

FIG. 10 depicts a flow diagram of a method 1000 to enable connection between the tow vehicle 108 and the trailer 106 in accordance with the present disclosure. FIG. 10 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 1000 starts at step 1002. At step 1004, the method 1000 may include providing the first portion 306 connected to the trailer 106. At step 1006, the method 1000 may include providing the second portion 308 connected to the tow vehicle 108. At step 1008, the method 1000 may include providing the sensor unit 324 connected to the first portion 306 and the second portion 308. As described above, the sensor unit 324 may be configured to generate a signal based on a second portion longitudinal movement in the first portion 306, and transmit the signal to the wagon microprocessor 206. The wagon microprocessor 206 may generate a command signal based on the received signal, and the EV chassis microprocessor 204 may control trailer wheel operation (e.g., apply brakes or provide throttle to the trailer 106) based on the command signal.

At step 1010, the method 1000 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A connector apparatus configured to connect a first vehicle with a second vehicle, the connector apparatus comprising:
    a first portion connected to the first vehicle, wherein the first portion is configured to pivot horizontally about a vertical axis;
    a second portion connected to the second vehicle, wherein:
        the second portion is configured to pivot vertically relative to a second vehicle plane, and
        the second portion is engaged with the first portion and configured to move horizontally relative to a first portion longitudinal axis when the second vehicle accelerates or decelerates; and
    a sensor unit connected with the first portion and the second portion, wherein the sensor unit is configured to:
        determine a distance and a direction of a second portion horizontal movement when the second portion moves relative to the first portion longitudinal axis;
        generate a signal based on the distance and the direction; and
        transmit the signal to a first vehicle microprocessor.

2. The connector apparatus of claim 1, wherein the second vehicle is a tow vehicle and the first vehicle is a trailer or a wagon.

3. The connector apparatus of claim 2, wherein the second portion is connected to the second vehicle via a tow bar.

4. The connector apparatus of claim 3, wherein a tow bar proximal end is connected to a second vehicle hitch and a tow bar distal end is pivotally connected about a horizontal axis to a second portion proximal end, and wherein the tow bar distal end is configured to pivotally rotate vertically relative to the second portion proximal end.

5. The connector apparatus of claim 1, wherein the first portion is connected to a first vehicle front axle.

6. The connector apparatus of claim 5, wherein the first portion is connected to a center portion of the first vehicle front axle about the vertical axis.

7. The connector apparatus of claim 1, wherein the first vehicle comprises an Electric Vehicle (EV) chassis.

8. The connector apparatus of claim 7, wherein the first vehicle microprocessor is communicatively coupled with the second vehicle, and wherein the first vehicle microprocessor is configured to:
    obtain information associated with a second vehicle direction of movement from the second vehicle;
    obtain the signal from the sensor unit;
    correlate the second vehicle direction of movement with the signal; and
    perform a predefined action based on the correlation.

9. The connector apparatus of claim 8, wherein the predefined action comprises causing the EV chassis to apply brakes to first vehicle wheels or causing the EV chassis to provide throttle to the first vehicle.

10. The connector apparatus of claim 1 further comprising one or more compression springs connected between the first portion and the second portion, wherein the sensor unit generates the signal based on a length of contraction of the one or more compression springs when the second portion moves.

11. The connector apparatus of claim 10, wherein the first portion comprises a lock box configured to enable the second portion horizontal movement relative to the first portion longitudinal axis, and disable a second portion vertical movement and a second portion lateral movement.

12. The connector apparatus of claim 11, wherein in the second portion comprises a first elongated part and a second elongated part, wherein the first elongated part and the second elongated part form an integrated structure of the second portion, wherein a first elongated part longitudinal axis is disposed perpendicular to a second elongated part longitudinal axis, wherein the first elongated part longitudinal axis is aligned parallel to the first portion longitudinal axis, and wherein the first elongated part and the second elongated part are partially disposed inside the lock box.

13. The connector apparatus of claim 12, wherein the lock box comprises an aperture, wherein a portion of the second elongated part protrudes out of the lock box via the aperture, and wherein the portion of the second elongated part protruding out of the lock box is configured to compress the one or more compression springs when the second portion moves relative to the first portion longitudinal axis.

14. The connector apparatus of claim 13, wherein aperture walls act as a positive stop limiting the second portion horizontal movement below a predefined distance limit when the second portion moves relative to the first portion longitudinal axis.

15. The connector apparatus of claim 1 further comprising a shock absorber configured to attenuate shock loads when the second portion moves relative to the first portion longitudinal axis.

16. The connector apparatus of claim 1, wherein the sensor unit comprises one or more load cells.

17. A connector apparatus configured to connect a first vehicle with a second vehicle, the connector apparatus comprising:
a first portion connected to the first vehicle, wherein the first portion is configured to pivot horizontally about a vertical axis;
a second portion connected to the second vehicle, wherein:
the second portion is configured to pivot vertically relative to a second vehicle plane, and
the second portion is engaged with the first portion and configured to move horizontally relative to a first portion longitudinal axis when the second vehicle accelerates or decelerates; and
one or more compression springs connected between the first portion and the second portion,
a sensor unit connected with the first portion and the second portion, wherein the sensor unit is configured to:
determine a length of contraction of the one or more compression springs when the second portion moves relative to the first portion longitudinal axis;
generate a signal based on the length; and
transmit the signal to a first vehicle microprocessor.

18. The connector apparatus of claim 17, wherein the first vehicle comprises an Electric Vehicle (EV) chassis.

19. The connector apparatus of claim 18, wherein the first vehicle microprocessor is communicatively coupled with the second vehicle, and wherein the first vehicle microprocessor is configured to:
obtain information associated with a second vehicle direction of movement from the second vehicle;
obtain the signal from the sensor unit;
correlate the second vehicle direction of movement with the signal; and
cause the EV chassis to apply brakes to first vehicle wheels or provide throttle to the first vehicle based on the correlation.

20. A method to enable connection between a first vehicle and a second vehicle, the method comprising:
providing a first portion connected to the first vehicle, wherein the first portion is configured to pivot horizontally about a vertical axis;
providing a second portion connected to the second vehicle, wherein:
the second portion is configured to pivot vertically relative to a second vehicle plane, and
the second portion is engaged with the first portion and configured to move horizontally relative to a first portion longitudinal axis when the second vehicle accelerates or decelerates; and
providing a sensor unit connected with the first portion and the second portion, wherein the sensor unit is configured to:
determine a distance and a direction of a second portion horizontal movement when the second portion moves relative to the first portion longitudinal axis;
generate a signal based on the distance and the direction; and
transmit the signal to a first vehicle microprocessor, wherein the first vehicle microprocessor is configured to cause braking or acceleration of the first vehicle based on the signal and a second vehicle direction of movement.

* * * * *